(12) United States Patent
Stover et al.

(10) Patent No.: US 10,983,294 B2
(45) Date of Patent: Apr. 20, 2021

(54) DEPLOYABLE FIBER OPTIC CABLE WITH PARTIALLY BONDED RIBBON FIBERS

(71) Applicant: Optical Cable Corporation, Roanoke, VA (US)

(72) Inventors: Michael A. Stover, Roanoke, VA (US); Teddy W. Leonard, Wirtz, VA (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 16/284,601

(22) Filed: Feb. 25, 2019

(65) Prior Publication Data

US 2019/0265425 A1 Aug. 29, 2019

Related U.S. Application Data

(60) Provisional application No. 62/635,864, filed on Feb. 27, 2018.

(51) Int. Cl.
*G02B 6/44* (2006.01)
(52) U.S. Cl.
CPC ......... *G02B 6/4404* (2013.01); *G02B 6/4478* (2013.01); *G02B 6/4494* (2013.01)

(58) Field of Classification Search
CPC .. G02B 6/4404; G02B 6/4478; G02B 6/4494; G02B 6/4407; G02B 6/4409; G02B 6/441
See application file for complete search history.

(56) References Cited

U.S. PATENT DOCUMENTS 10,094,995 B2 * 10/2018 Debban ................ G02B 6/4433
10,514,517 B2 * 12/2019 Sato ..................... G02B 6/4408

* cited by examiner

*Primary Examiner* — John Bedtelyon
(74) *Attorney, Agent, or Firm* — William G. Heedy; The Van Winkle Law Firm

(57) ABSTRACT

A deployable fiber optic cable for pairing with a connector, the cable including a plurality of partially bonded ribbon fibers each being sized and configured to be rolled into a circular cross section; an elongate member forming a slotted core including a plurality of rounded slots for longitudinally surrounding the circular cross sections of a corresponding plurality of the plurality of partially bonded ribbon fibers; a plurality of rugged fiber tubes each located adjacent a corresponding one of the plurality of slots and wherein each of the plurality of rugged fiber tubes longitudinally surround a corresponding plurality of the plurality of partially bonded ribbon fibers; a plurality of water-blocking yarn members each surrounding a corresponding one of the plurality of rugged fiber tubes; a rugged outer jacket; and a yarn strength member located between the rugged outer jacket and the slotted core.

18 Claims, 3 Drawing Sheets

US 10,983,294 B2

DEPLOYABLE FIBER OPTIC CABLE WITH PARTIALLY BONDED RIBBON FIBERS

RELATED APPLICATION

This application claims priority to and incorporates entirely by reference U.S. Provisional Patent Application Ser. No. 62/635,864 filed on Feb. 27, 2018.

FIELD OF INVENTION

This invention relates to a deployable cable designed for harsh environments and, more specifically, a small, flexible, helically stranded polyurethane deployable cable that utilizes partially bonded ribbon fibers, also known as rollable ribbons.

BACKGROUND OF THE INVENTION

Partially bonded ribbons have been used in fiber optic cables designed for indoor premises installation and for outdoor duct and direct bury installation. While such existing cables are useful for their intended purpose, they have limited environmental and mechanical ratings compared to other rugged tight buffer fiber optic cable designs for direct deployment and retrieval ground tactical application.

In view of the above-referenced shortcomings, there exists a need for a rugged fiber optic cable designs incorporating the partially bonded ribbons for direct deployment and retrieval ground tactical application.

SUMMARY OF THE INVENTION

In accordance with one form of this invention there is provided a deployable fiber optic cable for pairing with a connector including at least one partially bonded ribbon fiber that is sized and configured to be rolled into a circular cross section; at least one elongate member for longitudinally surrounding the at least one partially bonded ribbon fiber; a rugged outer jacket; and a yarn strength member located between the rugged outer jacket and the at least one elongate member.

In accordance with another form of this invention there is provided a deployable fiber optic cable for pairing with a connector, the cable including a plurality of partially bonded ribbon fibers each being sized and configured to be rolled into a circular cross section; an elongate member forming a slotted core including a plurality of rounded slots for longitudinally surrounding the circular cross section of a corresponding one of the plurality of partially bonded ribbon fibers; a rugged outer jacket; and a yarn strength member located between the rugged outer jacket and the slotted core.

In accordance with another form of this invention there is provided a deployable fiber optic cable for pairing with a connector, the cable including a plurality of partially bonded ribbon fibers each being sized and configured to be rolled into a circular cross section; an elongate member forming a slotted core including a plurality of rounded slots for longitudinally surrounding the circular cross sections of a corresponding plurality of the plurality of partially bonded ribbon fibers; a plurality of rugged fiber tubes each being located adjacent a corresponding one of the plurality of slots and wherein each of the plurality of rugged fiber tubes longitudinally surround a corresponding plurality of the plurality of partially bonded ribbon fibers; a plurality of water-blocking thread members each surrounding a corresponding one of the plurality of rugged fiber tubes; a rugged outer jacket; and a yarn strength member located between the rugged outer jacket and the slotted core.

BRIEF DESCRIPTION OF THE DRAWINGS

The subject matter which is regarded as the invention is set forth in the appended claims. The invention itself together with further objects and advantages may be better understood in reference to the following description taken in conjunction with the accompanying drawings in which:

Like reference numerals refer to like parts throughout the several views of the drawings.

DETAILED DESCRIPTION OF THE PREFERRED EMBODIMENTS

Figure 1:
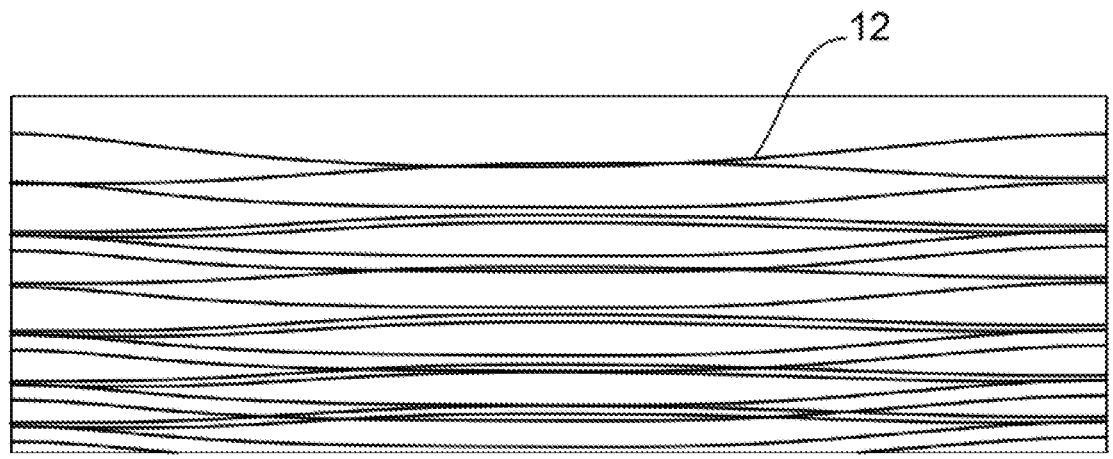
FIG. 1 is a perspective view of partially bonded ribbon fibers.

There is provided a fiber cable utilizing a polyurethane outer jacket or other similar jackets suitable for deploy-and-retrieve applications. The fiber optic cable is designed for a deployable/harsh environment application and is generally indicated as 10. Referring initially to FIG. 1, the fiber optic cable uses partially bonded ribbon fibers 12.

The fiber optic cable 10 allows for an innovative deployable/retrievable fiber optic cable that has a very small diameter for fiber counts greater than or equal to 8 fibers. The partially bonded ribbon fiber 12 has advantages over flat ribbons because it can be rolled into a circular cross-section for compact stranding with no preferential bend axis and allows for pairing with a connector, such as MPO connector termination, by presenting itself as a flat ribbon during the termination process.

Figure 2:
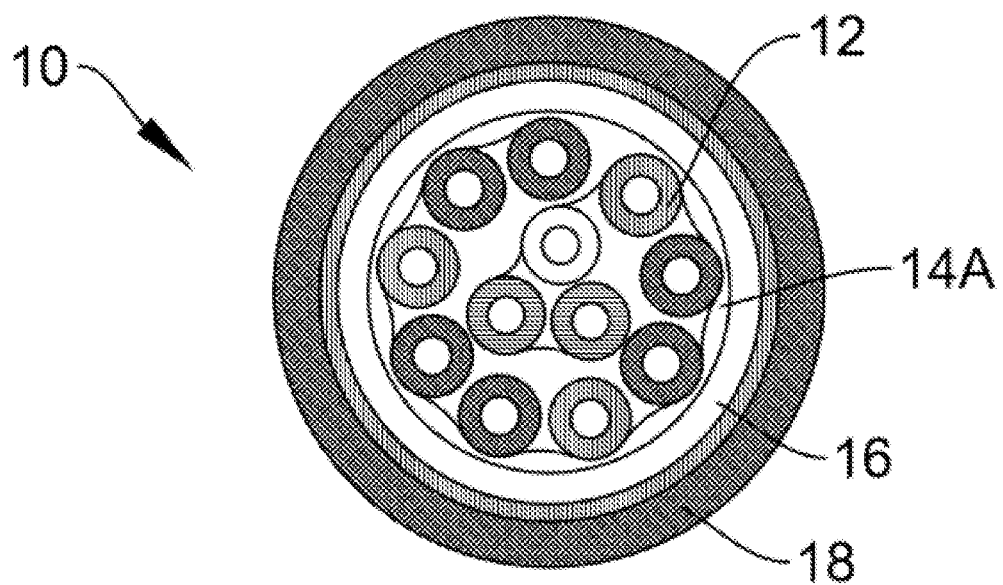
FIG. 2 is a side elevational view shown in cross section of one embodiment of the deployable fiber optic cable.

Referring to FIG. 2, a fiber optic cable 10 having a 12-fiber construction is shown including a partially bonded ribbon fiber 12 longitudinally surrounded by an elongate member 14A, such as a fiber tube, not having a yarn tensile strength component, and being made from a suitable rugged material, such as polymeric elastomers. In one embodiment, a yarn tensile strength member, such as an aramid yarn or fiberglass yarn, is located between the partially bonded ribbon fiber 12 and the elongate member 14A. A yarn strength member 16, such as aramid yarn, fiberglass yarn or other suitable yarn, surrounds the partially bonded ribbon fiber 12 and fiber tube 14A. A rugged outer jacket 18 surrounds the partially bonded ribbon fiber 12, fiber tube 14A and yarn strength member 16, and may be formed using a durable material suitable for repeated deployment and retrieval such as, but not limited to, polyurethane. By adding additional partially bonded ribbons 12, the design could contain additional fibers, such as four partially bonded ribbons 12 for a 48-fiber cable.

Figure 3:
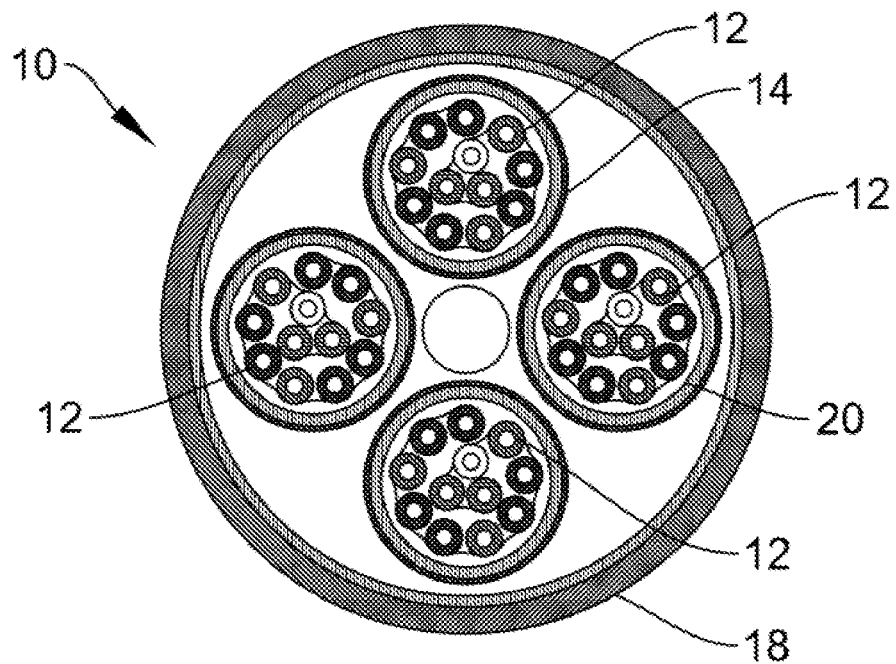
FIG. 3 is a side elevational view shown in cross section of one embodiment of the deployable fiber optic cable.

Referring now to FIG. 3, a fiber optic cable 10 having a 48-fiber helically stranded construction is shown including a plurality of partially bonded ribbon fibers 12 each surrounded by a fiber tube 14 made from a suitable rugged material such as polymeric elastomers and including a yarn tensile strength component 20, such as aramid yarn, fiberglass yarn or other suitable yarn, between the partially bonded ribbon 12 and the fiber tube 14, with the multiple elastomer tubes 14 helically stranded, an overall yarn strength member 16, such as aramid yarn, fiberglass yarn or other suitable yarn, and a rugged outer jacket 18 being formed using a durable material such as, but not limited to, polyurethane suitable for repeated deployment and retrieval. By adding additional partially bonded ribbons, in each tube, the design could contain additional fibers.

Figure 4:
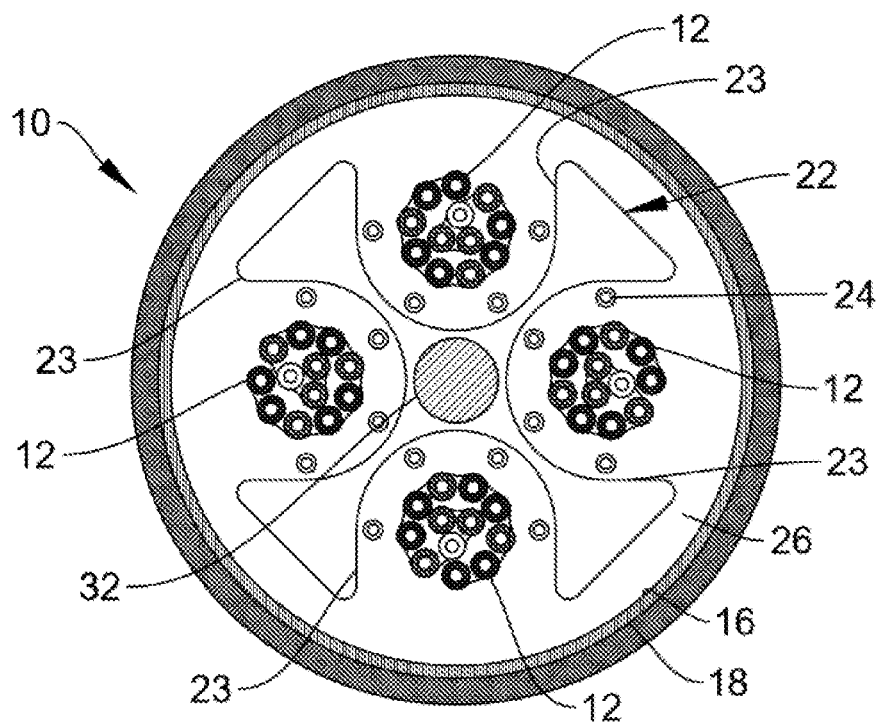
FIG. 4 is a side elevational view shown in cross section of one embodiment of the deployable fiber optic cable.

Referring to FIG. 4, a fiber optic cable 10 having a 48-fiber slotted core construction is shown including four partially bonded ribbon fibers 12 longitudinally placed in a slotted core 22 having rounded slots 23. Prior art slotted core designs have triangular shape slots. While not shown in this embodiment, the rounded slots 23 are sized and configured for receipt of respective fiber tubes 14 if desired. A plurality of water-blocking fillers 24 collectively surrounding an interior facing portion of a respective one of the four partially bonded ribbon fibers 12 may be included in certain embodiments for protecting the partially bonded ribbon fibers 12 from water ingress. A tape wrap 26 surrounds the slotted core 22 and surrounding the tape wrap 26 is an overall yarn strength member 16, such as aramid yarn, fiberglass yarn or other suitable yarn, and a rugged outer jacket 18 being formed using a durable material such as, but not limited to, polyurethane suitable for repeated deployment and retrieval.

Figure 5:
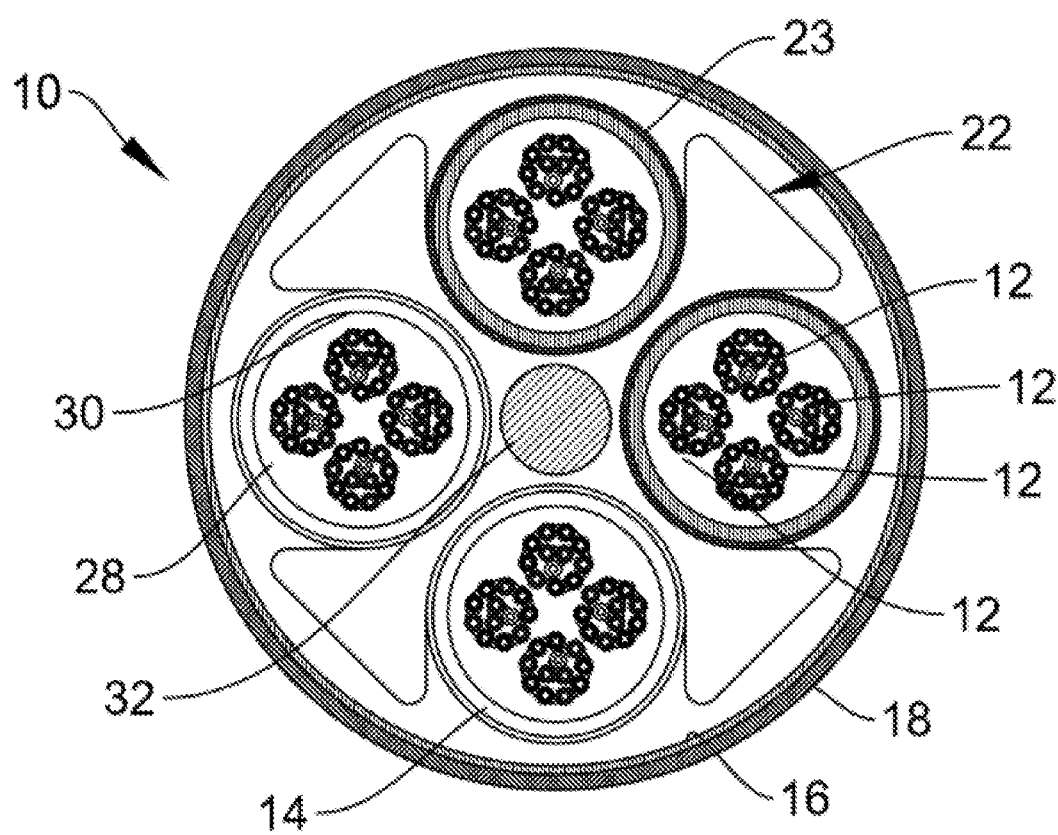
FIG. 5 is a side elevational view shown in cross section of one embodiment of the deployable fiber optic cable.

With reference to FIG. 5, a fiber optic cable 10 having a slotted core 22 with rounded slots 23 each being sized and configured for receipt of a respective fiber tube 14 is shown. Each tube 14 is structured and disposed for longitudinal receipt of at least one partially bonded ribbon fiber 12 (most typically, 12 to 48 fibers or more). The fiber tubes 14, made of a suitable rugged material, such as polymeric elastomers, are placed in the slotted core 22, with or without a water blocking component 28, such as water-blocking yarn or water-blocking threads, depending on the application, inside of the fiber tubes 14. In the depicted embodiment, primary water blocking yarn 30 (or water blocking thread) is located between the fiber tube 14 and slotted core 22. A central strength member 32 may be included for added structural strength. One non-limiting example of the central strength member 28 is an epoxy-glass rod located at the center of the slotted core 22.

In each embodiment, the fiber optic cable 10 may include a flame-retardant component suitable for indoor and outdoor applications.

Other cable construction options for added cut resistance and rodent protection utilizing the three designs above could include braided steel or bronze armor wire over the cable, or fiberglass yarn layer over the cable, with another polyurethane jacket over the braided wire or fiberglass yarn.

From the foregoing description of various embodiments of the invention, it will be apparent that many modifications may be made therein. It is understood that these embodiments of the invention are exemplifications of the invention only and that the invention is not limited thereto.

What is claimed is:

1. A deployable fiber optic cable for pairing with a connector, the cable comprising:
   at least one partially bonded ribbon fiber that is sized and configured to be rolled into a circular cross section;
   at least one elongate member for longitudinally surrounding the at least one partially bonded ribbon fiber, the at least one elongate member forming a slotted core including a plurality of rounded slots for longitudinally surrounding the circular cross section of a corresponding one of the plurality of partially bonded ribbon fibers;
   a yarn strength member located between a rugged outer jacket and the at least one elongate member;
   a plurality of fiber tubes are placed in the slotted core with or without a water blocking component such as a water-blocking yarn or a water-blocking thread; and
   the at least one rugged outer jacket surrounding the at least one partially bonded ribbon fiber, the plurality of fiber tubes and the yarn strength member by adding additional partially bonded ribbons.

2. The cable as recited in claim 1, wherein the at least one elongate member comprises at least one rugged fiber tube.

3. The cable as recited in claim 2, wherein the at least one rugged fiber tube is formed from polymeric elastomers.

4. The cable as recited in claim 1, wherein the rugged outer jacket is formed from polyurethane.

5. The cable as recited in claim 1, wherein the at least one partially bonded ribbon fiber comprises a plurality of partially bonded ribbon fibers and the at least one elongate member comprises a plurality of elongate members, and wherein each of the plurality of partially bonded ribbon fibers is surrounded by a corresponding one of the plurality of elongate members.

6. The cable as recited in claim 5, wherein the at least one partially bonded ribbon fiber comprises four partially bonded ribbon fibers and the at least one elongate member comprises four elongate members, and wherein each of the four partially bonded ribbon fibers is surrounded by a corresponding one of the four elongate members.

7. The cable as recited in claim 5, further comprising a plurality of yarn strength components each located between corresponding ones of the plurality of elongate members and the plurality of partially bonded ribbon fibers.

8. The cable as recited in claim 1, further comprising a flame-retardant component suitable for indoor application.

9. The cable as recited in claim 1, further comprising a flame-retardant component suitable for outdoor application.

10. The cable as recited in claim 1, further comprising a plurality of water-blocking fillers each being located between corresponding ones of the plurality of elongate members and the plurality of partially bonded ribbon fibers.

11. The cable as recited in claim 1, further comprising a central strength member received in the center of the slotted core.

12. The cable as recited in claim 11, wherein the central strength member comprises an epoxy-glass rod.

13. A deployable fiber optic cable for pairing with a connector, the cable comprising:
   a plurality of partially bonded ribbon fibers each being sized and configured to be rolled into a circular cross section;
   an elongate member forming a slotted core including a plurality of rounded slots for longitudinally surrounding the circular cross sections of a corresponding plurality of the plurality of partially bonded ribbon fibers;
   a tape wrap surrounding the slotted core;
   a plurality of rugged fiber tubes each being located adjacent a corresponding one of the plurality of slots and wherein each of the plurality of rugged fiber tubes longitudinally surround a corresponding plurality of the plurality of partially bonded ribbon fibers;
   a plurality of water-blocking thread members each surrounding a corresponding one of the plurality of rugged fiber tubes;

a yarn strength member located between a rugged outer jacket and the slotted core; and the at least one rugged outer jacket surrounding the partially bonded ribbon fiber, the fiber tube and the yarn strength member by adding additional partially bonded ribbons.

14. The cable as recited in claim 13, further comprising a central strength member received in the center of the slotted core.

15. The cable as recited in claim 14, wherein the central strength member comprises an epoxy-glass rod.

16. The cable as recited in claim 13, wherein the plurality of rugged fiber tubes is formed from polymeric elastomers.

17. The cable as recited in claim 13, wherein the rugged outer jacket is formed from polyurethane.

18. The cable as recited in claim 13, further comprising a plurality of water-blocking components each surrounding a corresponding plurality of the plurality of partially bonded ribbon fibers.

\* \* \* \* \*